Jan. 19, 1926.  
S. A. MOSS  
1,569,873  
SHOCK ABSORBER FOR VEHICLES  
Filed Oct. 3, 1921
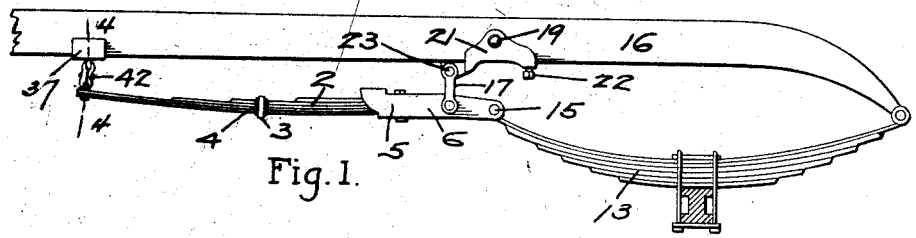
Fig. 1.
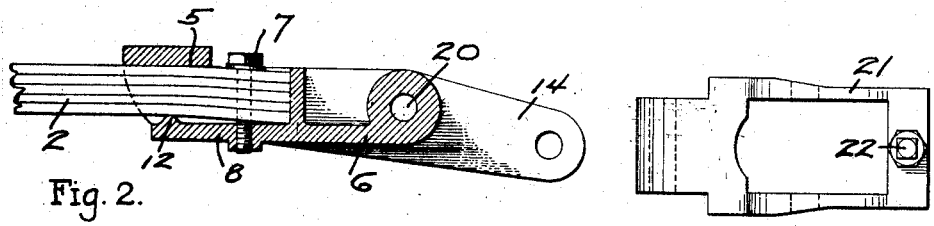
Fig. 2.
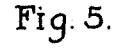
Fig. 5.
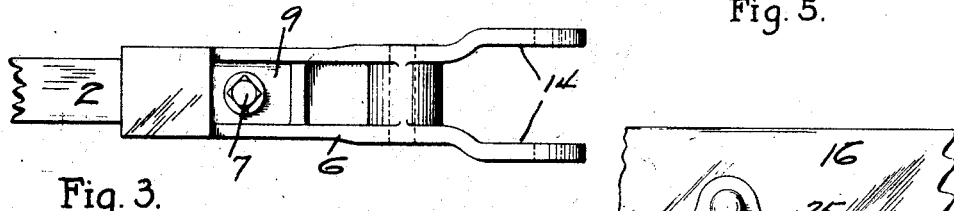
Fig. 3.
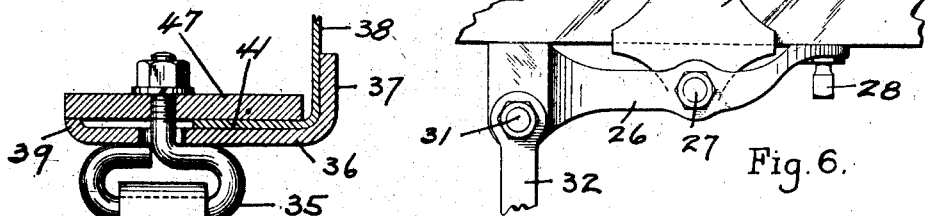
Fig. 4.    Fig. 6.
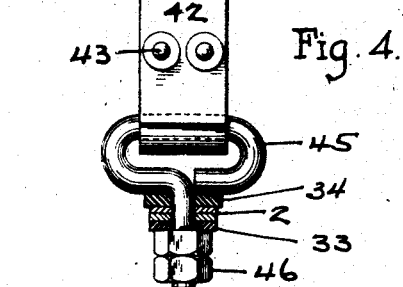
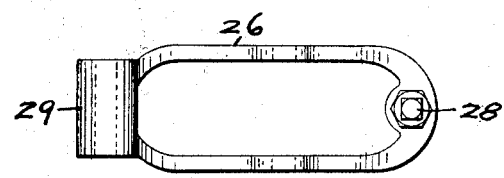
Fig. 7.
WITNESS  
H. Sherburne
INVENTOR  
SAMUEL A. MOSS.  
BY  
White Prost & Evans  
his ATTORNEYS Patented Jan. 19, 1926.

1,569,873

UNITED STATES PATENT OFFICE.

SAMUEL A. MOSS, OF OAKLAND, CALIFORNIA.

SHOCK ABSORBER FOR VEHICLES.

Application filed October 3, 1921. Serial No. 504,925.

*To all whom it may concern:*

Be it known that I, SAMUEL A. MOSS, a citizen of the United States, and a resident of Oakland, county of Alameda, and State of California, have invented a certain new and useful Shock Absorber for Vehicles, of which the following is a specification.

The invention relates to a shock absorber adapted for interposition between the frame of a motor driven vehicle, such as an automobile, and the main vehicle spring.

An object of the invention is to provide a shock absorber of the multiple leaf spring type that may be interposed between the vehicle frame and the main vehicle spring, to improve the riding qualities of the vehicle.

Another object of the invention is to provide a shock absorber of the multiple leaf spring type that may be installed on a vehicle without in any manner altering the construction of the vehicle, so that when desired, the shock absorber may be removed and the vehicle returned to its original condition.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one specific embodiment of my invention but it is to be understood that I do not limit myself to such form, since the invention, as set forth in the claims, may be embodied in a plurality of forms.

Referring to said drawings:—

Figure 1 is a side elevation of the device of my invention associated with a semi-elliptic front vehicle spring.

Figure 2 is a longitudinal section through the shock absorbing spring mounting.

Figure 3 is a plan or top view of the shock absorbing spring mounting.

Figure 4 is a section taken on the line 4—4 of Figure 1.

Figure 5 is an underneath view of the shackle mounting plate.

Figure 6 is a side elevation of a modified form of shackle mounting plate for use on vehicles having low hung frames.

Figure 7 is an underneath view of the plate shown in Figure 6.

The shock absorber of my invention is adapted for interposition between the frame of the automobile or other vehicle and the end of the vehicle main spring, to relieve the frame of shocks produced by the travel of the vehicle over the roadway. The device comprises a lever having a flexible arm and a rigid arm and is connected intermediate its ends to the vehicle frame. The flexible arm comprises a multiple leaf spring of gradually increasing flexibility from its base to its free end and the rigid arm comprises a housing or clamp or similar casting or structure to which the base of the auxiliary spring is secured. The flexible arm comprises a multiple leaf spring 2 composed of light thin leaf springs of varying length extending from the base of the spring toward the flexible end. The spring is relatively long and very elastic, but has liberal leaf friction which produces a braking effect during flexure of the spring. The friction effect is increased by binding the leaves of the spring together at points intermediate the ends thereof, the binding means being arranged to produce friction between the leaves, without preventing their relative slippage. This produces a spring having a ready movement at its free or flexible end of one or two inches, but which resists more strongly any deflection in excess of that amount. The leaves are bound together intermediate their ends by clamps 3 surrounding the leaves, the clamps being secured by rivets to the upper leaf of the spring at the point where the clamp is positioned. Interposed between the clamp and the spring and held tightly in place by the clamp, is a band of fabric friction material or webbing 4 which acts as a cushion to permit relative slipping movement of the spring leaves.

The base of the spring is tightly and securely held in a socket or housing 5 which is preferably formed integral with the rigid lever 6 which forms part of the composite lever shock absorber. The housing is provided with a longitudinally disposed socket in which the base end of the spring is secured by a cap screw 7 passing through the spring leaves and threaded into the lower wall 8 of the housing. The upper wall of the housing is provided with an aperture 9 to permit access to the head of the screw. To prevent the spring from rattling or vibrating in the housing, the lower wall thereof is provided with a transverse rib 12 on its upper surface against which the spring is clamped by the screw.

The lever 6 is provided at its opposite end with means for accomplishing its ready attachment to the end of the main vehicle spring 13, such as the fork 14, which in the present construction is directly connected to the end of the main spring by a bolt 15. The composite lever, comprising the flexible arm and the rigid arm, is fulcrumed intermediate its ends to the vehicle frame 16, either directly, in some instances or indirectly, as by the shackle 17, pivoted to the plate 21 secured to the frame, which plate is employed to obviate the necessity of drilling a hole in the vehicle frame. Normally, the shackle connected to the end of the main spring is mounted on a bolt extending through the frame at the point where the bolt 19 is now disposed. The application of my device, without mutilating the frame, requires that the shackle be displaced longitudinally of the frame. To accomplish this I employ a shackle mounting plate 21 secured to the frame by the bolt 19 and held against rattling by the set screw 22. The shackle mounting plate is provided with an eye to which the shackle 17, pivoted to the composite lever intermediate its ends at the eye 20, is connected by a bolt 23. The flexible arm of the composite lever has a rigid base, but it is flexible over the greater portion of its length, so that the lever may be considered as having a rigid arm and a flexible arm lying on opposite sides of its fulcrum.

On some automobiles, the steering arm depends from the frame in line with and behind the front main spring and in order to clear the steering arm, the rigid lever 6 is offset laterally, either in front of or behind the shackle 17.

On some automobiles, the main springs are hung very low, the ends of the springs being shackled to a bracket 25 riveted or otherwise secured to the vehicle frame and extending below said frame, as shown in Figure 6. In applying this shock absorber of my invention to a vehicle of this type, I employ a modified form of shackle mounting plate which is constructed to position the upper shackle bolt in substantially the same position vertically, as it originally occupied and to shift it longitudinally sufficiently to accommodate the shock absorber. This shackle plate is shown in Figures 6 and 7 and comprises a plate 26 adapted to straddle the bracket 25 and provided with alined bolt holes to receive the bolt 27 by which the plate is attached to the bracket 25. A set screw 28 serves to clamp the plate firmly in place so that all looseness and rattling is avoided. At its opposite end the plate is provided with an eye 29 to receive the bolt 31 to which the shackles 32 are connected.

The free or flexible end of the auxiliary spring 2 is connected to the vehicle frame, by a link or other flexible connection, and the auxiliary spring, when used in connection with the front vehicle spring, preferably extends longitudinally away from the adjacent end of the vehicle spring, so that the free end of the auxiliary spring is connected to the frame at a point remote from the main vehicle spring.

Two of the thin flexible leaves of the auxiliary spring preferably extend to the flexible end of the spring and they are provided adjacent the end with registering apertures, through which the shank of an eye-bolt 45 extends, the apertures being larger in diameter than the shank to permit slipping of the leaves. Surrounding the shank between the lower leaf and the holding nut 46 is a hard fiber washer 33 and interposed between the upper leaf and the eye is a rubber washer 34 which prevents any rattling or looseness of the eye-bolt or spring leaves.

Attached to the frame of the vehicle, which frame is usually of channel shape, substantially directly above the eye 45 is an eye 35, to which the eye 45 is flexibly connected. To obviate the necessity of drilling a hole in the channel frame, for attaching the eye 35, I provide a clamp which holds the eye-bolt 35 and which is clamped in place by the eye-bolt. The clamp comprises a lower plate 36 having a flange 37 on one end which lies against the web 38 of the channel and having a toe 39 at the other end which is substantially the same height as the thickness of the flange 41 of the channel. The upper plate 47 of the clamp bears against the flange of the channel and the toe 39 and the two plates are clamped to the channel flange by the eye-bolt 35, the shank of which extends through an aperture in the lower plate. The eyes are preferably connected together by a multifold link 42 of relatively stiff webbing, the folds of which are secured together with rivets 43, to increase the stiffness of the link. The link is sufficiently stiff, so that it does not bend, thus holding the end of the auxiliary spring spaced from the frame on the rebound of the vehicle and thus causing the shock absorbing spring to assist in checking rebound.

I claim:—

1. A shock absorber for vehicles comprising a multiple leaf spring of gradually increasing flexibility from a base to a flexible end, a housing having a socket therein in which said base is disposed, a transverse rib on the wall of said socket and a bolt extending through the base of the spring in the socket and pressing the spring against said rib.

2. A shock absorber for vehicles adapted to be positioned between the vehicle frame and the vehicle spring, comprising a lever having a flexible arm and a rigid arm fulcrumed to the vehicle frame intermediate said arms, means for attaching the end of the rigid arm to the end of the vehicle spring, a plate overlying a portion of the vehicle frame, a plate underlying said portion of the vehicle frame, a bolt engaging said plates and clamping them to the vehicle frame and means flexibly connecting said bolt and the end of the flexible arm.

3. A shock absorber for vehicles adapted to be positioned between the vehicle frame and the vehicle spring, comprising a lever having a flexible arm and a rigid arm fulcrumed to the vehicle frame intermediate said arms, means for attaching the end of the rigid arm to the end of the vehicle spring, a plate overlying a portion of the vehicle frame, a plate underlying said portion of the vehicle frame, an eye-bolt extending through said plates and clamping them to the vehicle frame, an eye-bolt secured to the end of the flexible arm and a flexible link connecting said eye-bolts.

In testimony whereof, I have hereunto set my hand.

SAMUEL A. MOSS.